United States Patent
Sugita

Patent Number: 6,061,153
Date of Patent: May 9, 2000

[54] IMAGE PROCESSING APPARATUS AND METHOD

[75] Inventor: Mitsuro Sugita, Kawasaki, Japan

[73] Assignee: Canon Kabushiki Kaisha, Tokyo, Japan

[21] Appl. No.: 08/351,956

[22] Filed: Dec. 8, 1994

[30] Foreign Application Priority Data

Dec. 9, 1993 [JP] Japan .................................. 5-309469
Nov. 16, 1994 [JP] Japan .................................. 6-281876

[51] Int. Cl.$^7$ ................................ G03F 3/08; H04N 1/46
[52] U.S. Cl. ........................................ 358/518; 358/531
[58] Field of Search ................................. 358/518, 298, 358/455, 501, 504, 523, 509, 527, 531; 356/326, 328, 406, 407; 348/70, 71

[56] References Cited

U.S. PATENT DOCUMENTS

| | | | |
|---|---|---|---|
| 4,500,919 | 2/1985 | Schreiber | 358/518 |
| 5,078,150 | 1/1992 | Hara et al. | 348/71 |
| 5,157,506 | 10/1992 | Hannah | 358/298 |
| 5,221,959 | 6/1993 | Ohyama et al. | 356/326 |
| 5,357,448 | 10/1994 | Stanford | 364/526 |
| 5,387,977 | 2/1995 | Berg et al. | 356/407 |
| 5,428,720 | 6/1995 | Adams, Jr. | 358/518 |
| 5,434,645 | 7/1995 | Usami | 358/520 |

FOREIGN PATENT DOCUMENTS 5-115002  5/1993  Japan ........................... H04N 1/40

*Primary Examiner*—Kimberly A. Williams
*Attorney, Agent, or Firm*—Fitzpatrick, Cella, Harper & Scinto

[57] ABSTRACT

An image processing apparatus and method for performing color processes by using spectral characteristics values, namely, spectral information comprises an input unit to input image information shown by spectral information, a color processing unit to color process on the basis of the image information inputted by the input unit, a spectral information display unit to display the spectral information, a spectral information correction unit to correct the spectral information, and a formation unit to form an image on the basis of the image data which was color processed by the color processing means.

18 Claims, 12 Drawing Sheets

IMAGE PROCESSING APPARATUS AND METHOD

BACKGROUND OF THE INVENTION

1. Field of the Invention

The present invention relates to image processing apparatus and method for executing a color process by using spectral characteristics values, namely, spectral information.

2. Related Background Art

Hitherto, the following two methods are well known for a color designation or a color process in a color processing apparatus.

(a) The color designation and color process are executed by using calorimetric system signals such as RGB, CMYK, HVC, L*a*b*, YIQ, or the like, namely, a set of a small number of (such as 3 or 4) values as color information.

(b) The color designation and color process are executed by using a color sample displayed by display means such as CRT, LCD, silver-salt photograph, electrophotograph, printed matter, or the like as color information.

In color image, color information inherently includes spectral characteristics values such as spectral luminous intensity, spectral luminance, spectral reflectance, spectral transmittance, spectral absorption coefficient, and the like, namely, physical values depending on a wavelength of a light. Since each of those spectral characteristics values has a continuous infinite degree of freedom, a degree of freedom of the color designation and color process are very large.

The color information mentioned in the above item (a) merely uses a part of the degree of freedom of the information of the spectral characteristics values, namely, only 3 or 4 degree of freedom, so that the degree of freedom of the color designation and color process is limited.

The color information mentioned in the above item (b) has the problem as that of (a) in a sense that the display means uses only a part of the degree of freedom of the information of the spectral characteristics values like an example such that a display such as CRT, LCD, or the like uses RGB signals and an electrophotograph, a printed matter, or the like uses inks of four color of CMYK or of finite number of inks. Further in (b), since a color reproduction limit which is peculiar to each display means exists, namely, colors which cannot be displayed exist in the color sample, the degree of freedom of the color designation and color process is further small.

A specific example showing such a shortage of the degree of freedom will now be described hereinbelow.

FIG. 8 is a diagram showing the spectral characteristics values showing the colors of a printed matter. The printed matter is irradiated by a light $i_0(\lambda)$ from a light source and outputs a light of $i(\lambda)$ to an observer. In this instance, $i_0(\lambda)$ and $i(\lambda)$ denote spectral irradiation luminances.

A spectral reflectance $R(\lambda)$ of the printed matter is expressed by using the spectral irradiation luminances by the following equation.

$$i(\lambda) = R(\lambda)i_0(\lambda)$$

For a spectral characteristics value $F(\lambda)$ of such a spectral irradiation luminance, spectral reflectance, or the like, RGB values by an rgb calorimetric system of the CIE (1931) are calculated by the following conversion equations by using color functions $\bar{r}$, $\bar{g}$, $\bar{b}$ of rgb or the like in FIG. 9.

$$R = \int F(\lambda)\bar{r}(\lambda)d\lambda \qquad (1)$$
$$G = \int F(\lambda)\bar{g}(\lambda)d\lambda$$
$$B = \int F(\lambda)\bar{b}(\lambda)d\lambda$$

FIG. 10 is a diagram showing the spectral characteristics values when the same printed matter is irradiated by two kinds of light sources.

A light source 1 is called equal energy spectral white. A light source 2 is obtained by color matching the light source 1 by monochromatic spectral lights of three stimulus values such as 435.8 nm, 546.1 nm, and 700 nm of the rgb system determined by the CIE.

It is now assumed in the present specific example that the printed matter reflects the lights of wavelengths below 690 nm and absorbs the lights of wavelengths above 690 nm.

The spectral characteristics values of the printed matter irradiated by the light sources 1 and 2 are as shown in the diagram and the lights whose wavelengths are 690 nm or longer are lost, respectively.

FIG. 11 is a diagram showing the same phenomenon as that of FIG. 10 by RGB values by the above-mentioned conversion equations.

From FIGS. 10 and 11, it will be understood that there are differences of the observed values between the light sources 1 and 2 with respect to the spectral characteristics values and the RGB values.

When an attention is paid only to the display by the RGB values in FIG. 11, however, the two systems of the light sources 1 and 2 are substantially the same system with respect to both of the light source and the printed matter. The result such that the different RGB values occur as observed values from quite the same system as mentioned above shows that it is impossible to express the color of such a system by the RGB values and the degree of freedom for the color designation is insufficient.

A fact that, hitherto, a color deviation occurring by a light source change in case of using the light source including bright lines such as a fluorescent lamp cannot be sufficiently adjusted will now be explained hereinbelow as a specific example.

FIG. 12 is a diagram showing spectral distributions. A spectral distribution 101 shows a color of a reflection matter; a spectral distribution 102 a color of the light source 1; and a spectral distribution 103 a color of a reflection matter 101 irradiated by the light source 102.

FIG. 13 is a diagram showing spectral distributions when the light source 1 used in FIG. 12 is changed to the light source 2. The spectral distribution 101 shows the color of the same reflection matter as that in FIG. 12; a spectral distribution 202 a color of the light source 2; and a spectral distribution 203 a color of the reflection matter irradiated by a light source 202.

The spectral distribution of the fluorescent lamp which is generally used includes the bright lines of 389 nm, 405 nm, 408 nm, 436 nm, 492 nm, 546 nm, 578 nm, and 691 nm.

In order not to lose the generality, two bright lines for the light source 1 and three bright lines for the light source 2 are selected and combined from among the bright lines included in the fluorescent lamp and (greenish) while light is used as both of the light sources 1 and 2. The XYZ values of the light sources 1 and 2 are the same (100, 139, 122).

For the two light sources 1 and 2 having the same XYZ values as mentioned above, the chromaticity values of the three-value type such as rgb values, L*a*b* values, or the like which are converted and calculated from the XYZ values are naturally the same.

Under such a condition, when a calculation to adjust the color deviation in association with the change of the light source is performed, since there is no change with respect to the three chromaticity values, it is judged that there is no color deviation.

The color deviation, however, actually exists and the colors which are actually obtained are light green blue (XYZ values: 81, 116, 109) and dark red purple (XYZ values: 8, 2, 24) which are different in hue, lightness, and chroma saturation as shown in the spectral distributions 103 and 203. Practically, it is necessary to adjust such a color deviation, namely, from light green blue to dark red purple.

As mentioned above, the adjustment of the color deviation in association with the light source change cannot be performed at a sufficient accuracy. This is a big problem also from a viewpoint such that a color matching system is built in the environment of different light sources. Particularly, when considering a present situation such that in many cases, color printed matters and pictures are appreciated and observed under the fluorescent lamp, it is a very serious problem.

SUMMARY OF THE INVENTION

It is an object of the invention to provide image processing apparatus and method which can solve the above-mentioned problems.

Another object of the invention is to prevent that a degree of freedom is limited in a color process.

Still another object of the invention is to form output image information based on a light source.

Further another object of the invention is to easily set a light source to see a predetermined image by a desired color.

In order to accomplish such objects, according to a preferred embodiment of the invention, there is provided an image processing apparatus comprising: input means for inputting image information; and color processing means for color processing on the basis of the image information inputted by the input means, wherein the image information is shown by spectral information.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will now be described hereinbelow with reference to the drawings.

[Embodiment 1]

Figure 1:
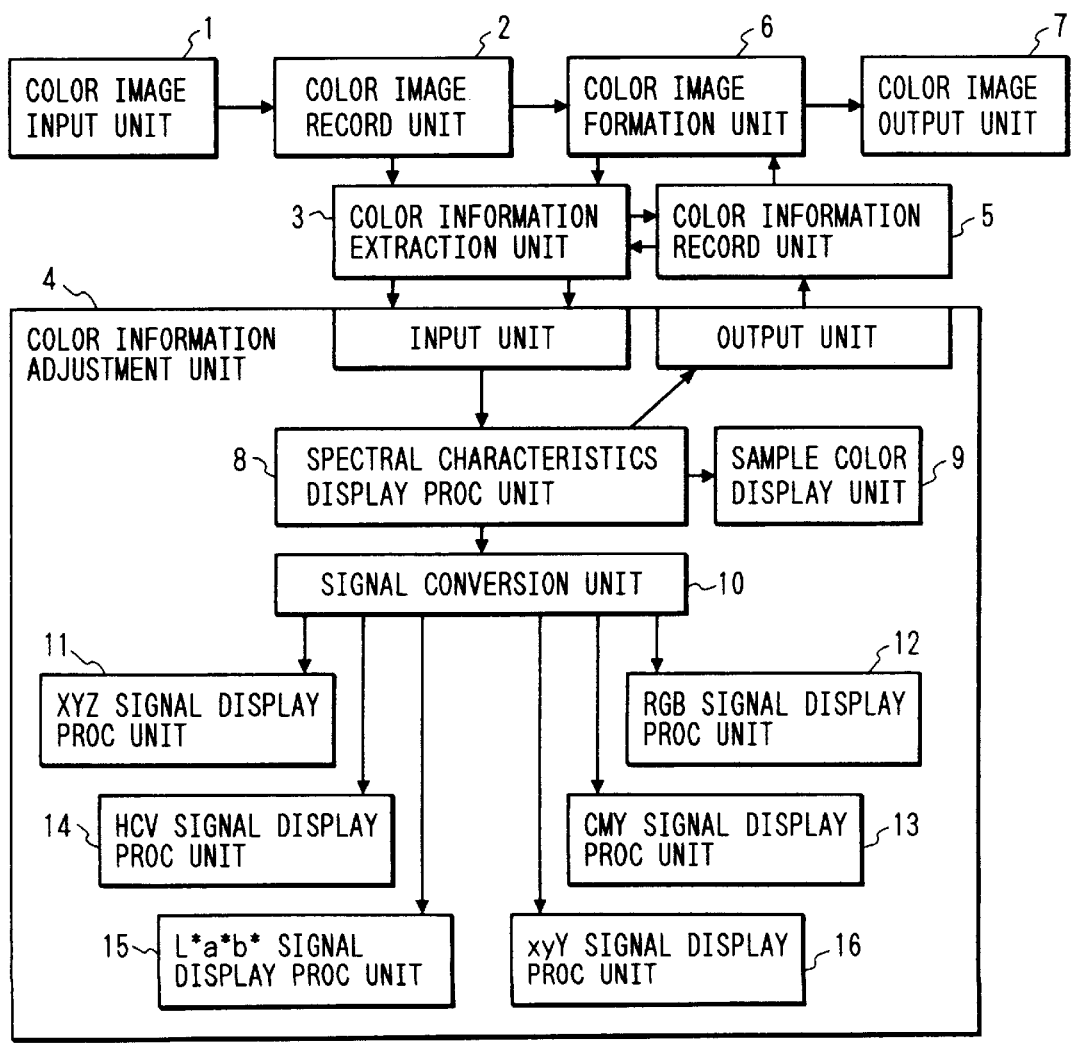
FIG. 1 is a functional block diagram showing a construction of a color processing apparatus of the embodiment 1 to which the invention is applied.

FIG. 1 is a diagram showing an example of a construction of an image processing apparatus for executing a color process by using spectral characteristics values.

Figure 2:
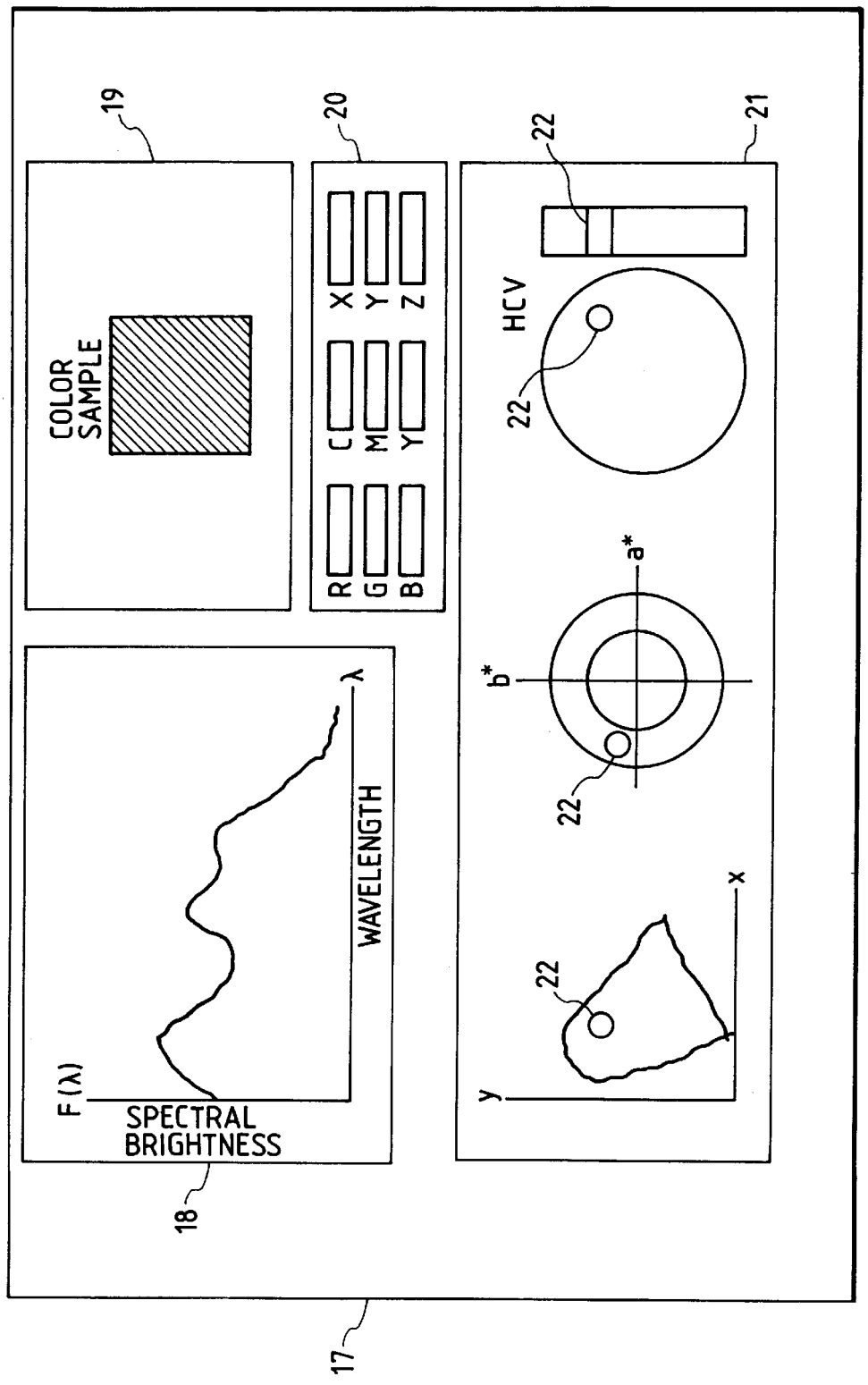
FIG. 2 is a functional block diagram showing an example of a construction of a display for color information adjustment to which the invention is applied.

FIG. 2 is a diagram showing an example of a construction of a display for color information edition which is used when the color process is executed.

In FIG. 1, a color image input unit 1 reads an original, generates an image signal, and transfers the signal to a color image record unit 2. For example, a camera, still video, video camera, or the like can be used for the color image input unit 1. Particularly, in the case where the color process is executed by a color information adjustment unit 4 by using spectral characteristics values, the spectral characteristics values showing the original are inputted by using, for instance, a spectrophotometer, a spectral luminance meter, or the like as a color information measuring apparatus.

The color image input unit inputs a corresponding spectral characteristics value F(λ) as a color image signal every pixel. Therefore, different from the conventional method of inputting a calorimetric system signal of RGB or the like every pixel, the color image input unit enables color information to be inputted at a very high accuracy.

The color image record unit 2 records the color image signal onto a recording medium. As a recording medium, for example, an RAM, a magnetic disk, a magnetooptic disk, a magnetic tape, or the like can be used.

A color information extraction unit 3 reads out the color image signal from the color image record unit 2, extracts the spectral characteristics value F(λ) as color information from the read signal, and outputs as a color signal.

The spectral characteristics value F(λ) sent from the color information extraction unit 3 is supplied to the color information adjustment unit 4 and is sent to a spectral characteristics display processing unit 8. The spectral characteristics display processing unit 8 displays, for instance, the spectral characteristics value F(λ) as a graph onto a display 18 for adjustment shown in FIG. 2. In the graph, the curve can be arbitrarily deformed like, for example, Illustrator (manufactured by Adobe Co., Ltd.) as an image forming application for a personal computer "Macintosh" manufactured by Apple Computer Co., Ltd.

Spectral characteristics values F'(λ) corresponding to such a deformed curve can be outputted from the color information adjustment unit 4 as an adjusted color signal, namely, adjustment color information.

The spectral characteristics values which are being processed by the spectral characteristics display processing unit 8 are sent to a sample color display unit 9 and are displayed on a display 19 for edition within a reproducible color range of the display. The spectral characteristics values are also outputted to a signal conversion unit 10 and converted to the XYZ signals, RGB signals, CMY signals, HCV signals, L*a*b* signals, and xyY signals. Those signals are outputted to display processing units 11, 12, 13, 14, 15, and 16, respectively. Reference numeral 20 denotes a diagram showing a state in which the display processing units 11, 12, and 13 are arranged on a display 17 for adjustment. Reference numeral 21 denotes a diagram showing a state in which the display processing units 14, 15, and 16 are arranged on the display 17 for adjustment.

The user, therefore, can adjust the color under processing on the basis of a desired expressing method.

When the color which is being processed is out of the reproducible color range of the display, such a fact can be also informed to the user.

It is also possible to construct such that the user displays only the desired expressing method without simultaneously displaying a plurality of expressing methods on the display as mentioned above.

Each of the display processing units 11, 12, 13, 14, 15, and 16 can change the displayed numerical value or the position of a pointer 22 and input. The signal changed in this instance is sent to the signal conversion unit 10 and is converted to the signals corresponding to the spectral characteristics display processing unit 8 and the other display processing units 11, 12, 13, 14, 15, and 16.

The adjustment color signal $F'(\lambda)$ adjusted by the color information adjustment unit 4 as mentioned above is either recorded in a color information record unit 5 or outputted to a color image formation unit 6.

Although the above color information adjustment method can perform a fine adjustment as compared with the conventional method, it is a quite new adjusting method in view of advantages such that not only the fine adjustment can be executed but also the adjustment can be performed on the assumption of a physical influence of the color. Thus, the worker can execute the color adjustment in consideration of, for example, the absorption band of the coloring material and the spectral lines of the light source for illumination.

According to the embodiment, in addition to the above effects, an interface which can be further easily dealt is realized by providing a link function with a plurality of calorimetric system signals.

The color information record unit 5 reports the color signals onto the recording medium. As a recording medium, for example, an RAM, a magnetic disk, a magnetooptic disk, a magnetic tape, or the like can be used.

The color image formation unit 6 forms a color image newly or on the basis of the color image signal recorded by the color image record unit 2. In the color image formation, a method of inputting the color signals recorded on the recording medium by the color information record unit 5 or a method of inputting the color signals outputted from the color information adjustment unit 4 can be used as a method of selecting and designating a color. The formed color image is sent to a color image output unit 7 as a color image signal and is outputted as a color image. As a color image output unit, for example, a display, a printer, or the like can be used.

In the above-mentioned color processing apparatus, when considering the single color image input unit, since the unit inputs the corresponding spectral characteristics value $F(\lambda)$ as a color image signal every pixel, different from the conventional method of recording the colorimetric system signals of RGB or the like every pixel, the color information can be inputted at a very high accuracy. Therefore, even the single color image input unit can obtain the effect of the invention so long as the spectral characteristics values are used.

When considering the single color image record unit, since the unit records the corresponding spectral characteristics value $F(\lambda)$ as a color image signal every pixel, different from the conventional method of recording the calorimetric system signals of RGB or the like every pixel, the color information can be recorded at a very high accuracy. Therefore, even the single color image record unit can obtain the effect of the invention so long as the spectral characteristics values are used.

When considering the single color information record unit, since the unit records the spectral characteristics value $F(\lambda)$ as color information, different from the conventional method of recording the calorimetric system signals of RGB or the like, the color information can be recorded at a high accuracy. The recording medium to which the color information has been recorded by the above system can be used in various color processing apparatuses as a collection of color samples including the color information of a high accuracy. The color sample collection or the like created by a specialist has an artistic value as well. Therefore, even the single color information record unit can obtain the effect of the invention so long as the spectral characteristics values are used.

When considering the single color image formation unit, the unit can designate the corresponding spectral characteristics value $F(\lambda)$ every pixel in the color image formation, different from the conventional method of recording the calorimetric system signals of RGB or the like every pixel, the color information can be designated at a very high accuracy and also a color image of a very large degree of freedom can be formed. Therefore, even the single color image formation unit can obtain the effect of the invention so long as the spectral characteristics values are used.

When considering the single color image output unit, the unit outputs the corresponding spectral characteristics value $F(\lambda)$ every pixel as a color image signal. Therefore, different from the conventional method of recording the calorimetric system signals of RGB or the like every pixel, an image can be outputted at a very high accuracy with respect to the color information. Further, even single color image output unit can obtain the effect of the invention so long as the spectral characteristics values are used.

[Embodiment 2]

The embodiment 1 is characterized in that the color is modified by using the spectral characteristics values for reproducing an image in a desired color of the user.

In order to output a desired image by an image output apparatus such as a printer or the like, it is necessary to form reproduction image information on the basis of various parameters regarding output conditions and the like for the input image information in addition to that the user modifies the color as in the embodiment 1.

As a specific example of the parameters, for example, there are illuminance light source, coloring material for outputting, visual sense characteristics of the observer, and the like.

The embodiment 2 will now be described with respect to a case where the parameters about coloring material characteristics, characteristics of a material on which the recording is performed, and structures of recording matters are used when the reproduction image information is formed.

Figure 3:
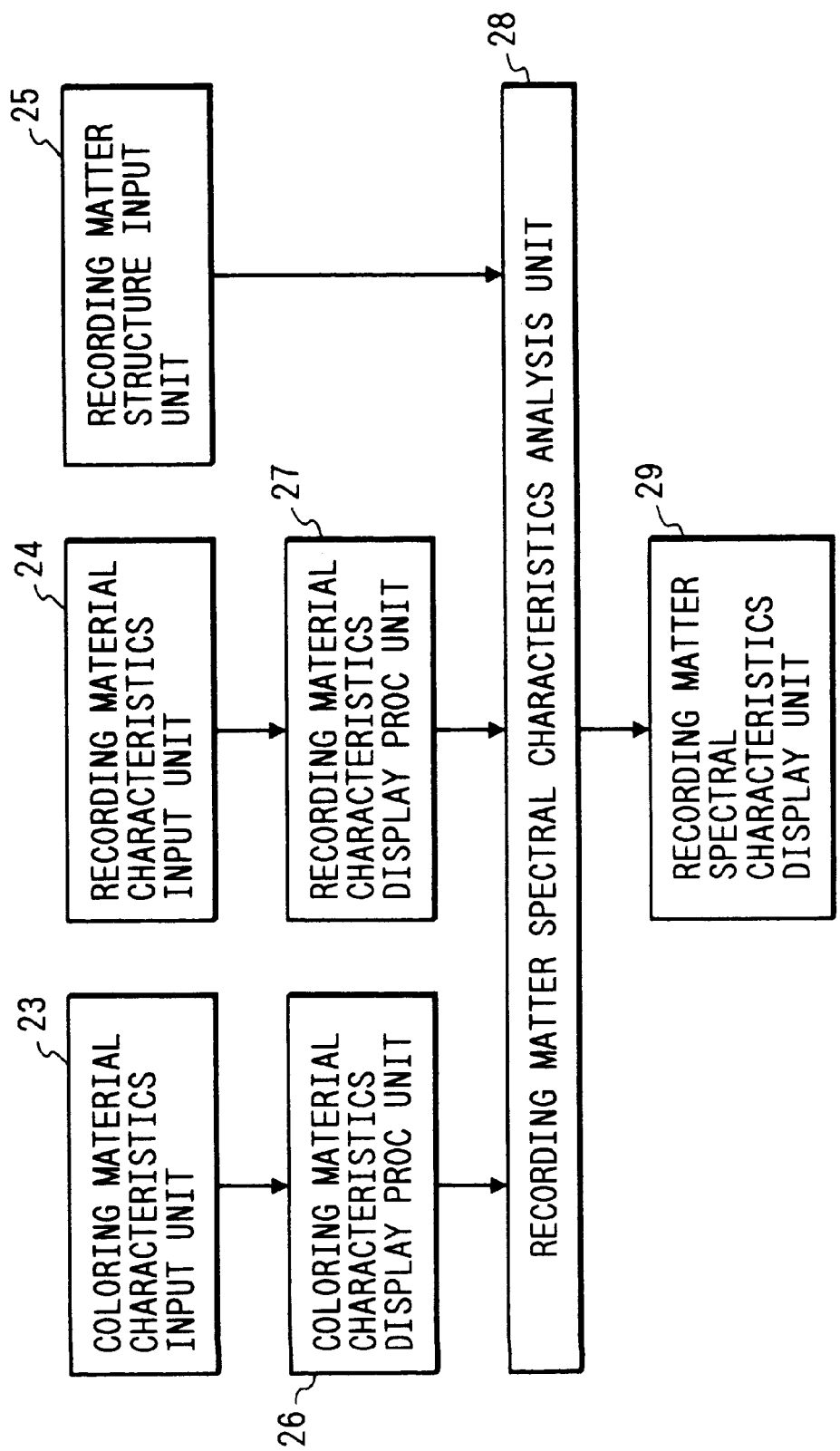
FIG. 3 is a functional block diagram showing a construction of a color processing apparatus of the embodiment 2 to which the invention is applied.

FIG. 3 is a functional block diagram showing an example of a construction of a color processing apparatus according to the embodiment 2.

In the embodiment 2, "recording matters" denote, for example, structures including a material on which the recording is performed and a coloring material and having peculiar spectral characteristics in printing, electrophotograph, ink jet recording, or the like.

As a material on which the recording is performed (to be referred to as a recording material hereinafter), for example, a paper, a sheet for OHP, a back print film, glass, or the like can be used. It is not always necessary to, particularly, use the recording material like a sheet but a stereoscopic recording material can be also used.

The coloring material denotes what is called a pigment, dye, or the like. For instance, ink, paint, oil colors, colored pencil, toner, or the like can be used.

The characteristics inputted from a coloring material characteristics input unit 23 and a recording material characteristics input unit 24 are respectively sent to display processing units 26 and 27, by which the input data can be adjusted. In the display processing units, the color information adjustment unit 4 shown in FIG. 1 and the display 17 for adjustment shown in FIG. 2 are used for the display processing of the characteristics regarding the color.

The information obtained by the display processing units 26 and 27 and a recording matter structure input unit 25 is sent to a recording matter spectral characteristics analysis unit 28. The recording matter spectral characteristics analysis unit 28 outputs the spectral characteristics values of the recording matters by, for example, a light beam tracking apparatus or the like including a random number generator.

As a recording matter spectral characteristics display unit 29, a display unit having only the function of the color information adjustment unit 4 shown in FIG. 1 and the display function of the display 17 for adjustment shown in FIG. 2 is used.

In the embodiment with such a construction, when the color reproduction of the recording matter is analyzed, the analysis using the spectral characteristics value is performed instead of the conventional analysis using the calorimetric system signals of, for example, RGB or the like. Therefore, for example, a casual relation such as a difference of the reproduction colors due to a selection of materials of papers or coloring materials or the like can be more physically analyzed.

The embodiment relates to the apparatus in which the spectral characteristics values of the input data and the spectral characteristics values of the analysis result are linked. Such a fact is also one of the reasons which make it easier to consider the foregoing casual relation.

As mentioned above, it will be obviously understood that when such an analysis environment is embodied, a degree of difficulty of the color reproduction analysis of the recording matter is reduced and the development regarding the structures of the recording material, coloring material, and recording matter which are used for the recording matters in the printing, electrophotograph, ink jet, or the like will be promoted.

It is also possible to combine the embodiments 1 and 2 and to construct in a manner such that the user modifies the color for the image information formed on the basis of various output conditions, thereby obtaining desired reproduction image information.

As parameters, parameters indicative of the characteristics of the observer can be also used.

That is, by using parameters regarding the visual sense characteristics of the observer, the color process based on the observer as a target can be performed.

[Embodiment 3]

The embodiment 3 will now be described in detail with respect to processes for forming reproduction image information by executing a color adjustment using characteristics of a light source and a spectral reflectance as a spectral characteristics value of image data.

Figure 4:
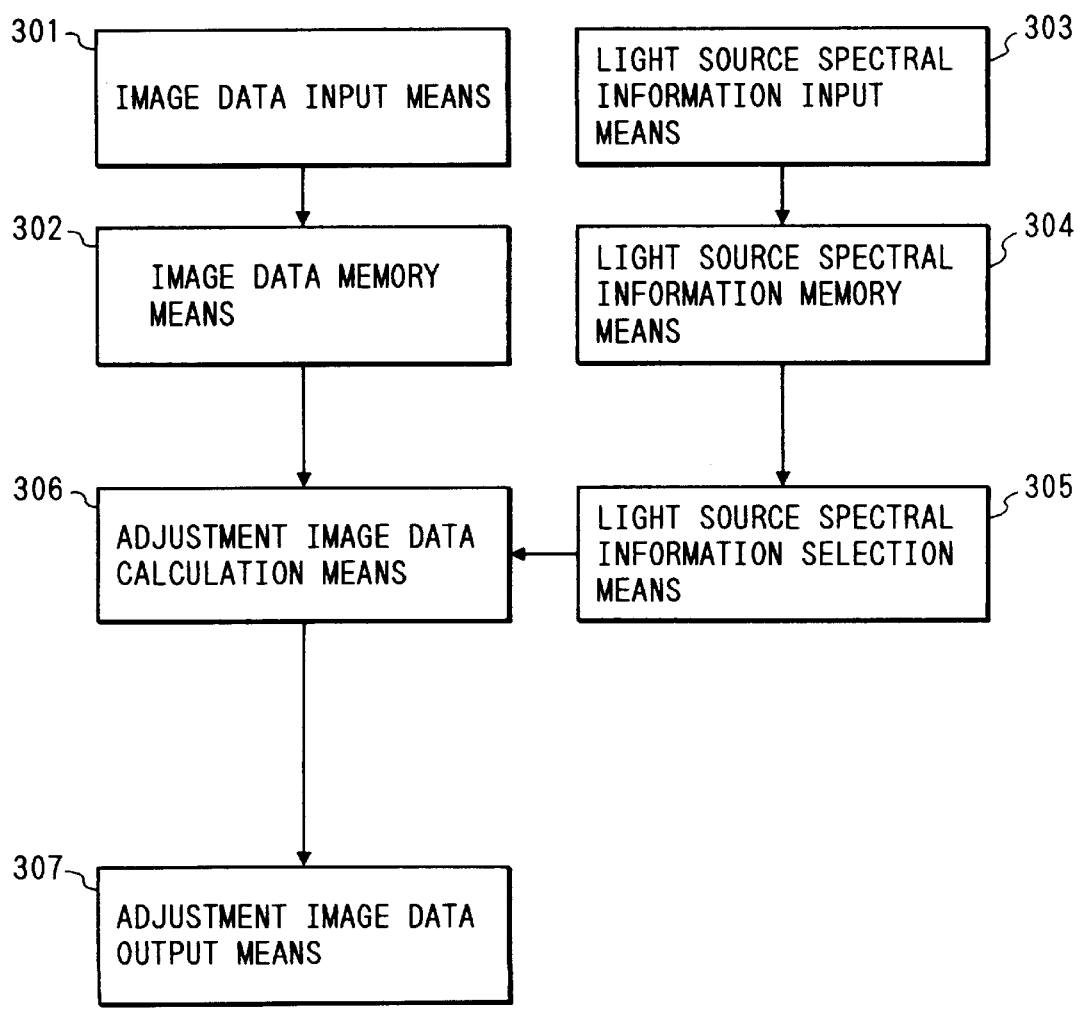
FIG. 4 is a functional block diagram showing a construction of a color processing apparatus of the embodiment 3 to which the invention is applied.

FIG. 4 is a block diagram showing a functional construction according to the embodiment 3.

Image data input means 301 inputs image data in which a spectral reflectance is allocated every pixel.

Image data memory means 302 stores the image data outputted from the image data input means. As a memory medium, an electronic memory such as an RAM or the like, a magnetic disk, a magnetooptic disk, or the like can be used.

On the other hand, the spectral characteristics values regarding various light sources, namely, spectral information is inputted by light source spectral information input means 303 with respect to characteristics of the light source. As spectral information of the light source, a spectral irradiation illuminance is used and is measured by a spectral irradiation illuminance meter. As other spectral information, it is also possible to properly use a spectral irradiation brightness, a spectral illuminance, a spectral brightness, or the like. As spectral information of the light source, a spectral transmittance of a filter which is used to adjust the light of the light source and an influence by a light of indirect illuminance can be also properly added.

Light source spectral information memory means 304 stores the spectral information of the light source received from the light source spectral information input means 303 in correspondence to each light source.

Light source spectral information selection means 305 selects information regarding the light source which is used when the reproduction image is observed from among the spectral information regarding various light sources stored in the light source spectral information memory means 304.

Figure 5:
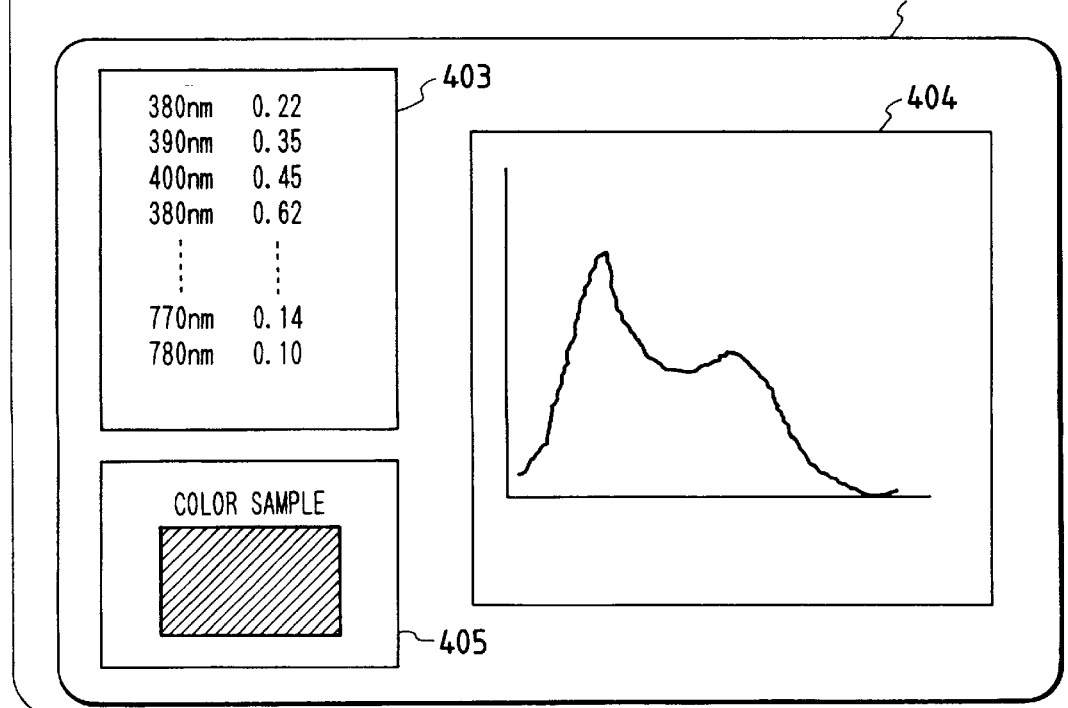
FIG. 5 is a diagram showing an example of a user interface which is used when a light source is selected.

FIG. 5 shows an example of a user interface in the light source spectral information selection means 305. Names of the light sources, whose characteristics have been stored, filters, and environments are displayed on a light source name list display unit 401. When the name of the light source is selected, the spectral information of the selected light source is displayed on a spectral information display unit 402.

The light source spectral information selection means 305 can select a plurality of kinds of light sources at once. Therefore, the spectral information displayed on the spectral information display unit 402 is the information in which the spectral information of all of the selected light sources is unified. The spectral information display unit 402 has a display unit 403 to display the spectral information in a table format, a display unit 404 to display the spectral information in a curve format, and a display unit 405 to display the color which is actually seen under the light source in which white color as a reference is selected as a color sample.

In the table format displayed by the display unit 403, numerical value data can be changed and can be certainly set to predetermined values. On the other hand, in the curve format displayed by the display unit 404, since the curve can be deformed by a position input device such as mouse, pointer, or the like, the whole curve can be easily set. Further, since an observation state of white color as a reference in the set light source is displayed as a color sample by the spectral information display unit 402, the influence by the light source can be confirmed when the light source is set.

As mentioned above, the light source spectral information selection means 305 can select a plurality of light source spectral information stored, display the information simultaneously, perform composite arithmetic operations such as addition, subtraction, multiplication, division, and the like, and unify them. For example, when the spectral transmittance of the filter is used, multiplication is mainly used. When the indirect illumination light, namely, an influence by environment is used, the arithmetic operations can be executed by using spectral reflectances or the like of a shade of a lamp, a wall, and the like. Since the arithmetic operations of the indirect illuminance are complicated, the arithmetic operation amount can be also reduced by using the Monte Carlo method using random numbers or the like.

Further, the modified and edited light source spectral information can be stored and registered as a new light source into the light source spectral information memory means. It is also possible to newly form table data or a curve as a new light source.

In adjustment image data calculation means 306, a color change of the image data under the light source selected on the basis of the image data outputted from the image data memory means 302 and the light source spectral information outputted from the light source spectral information selection means 305 is calculated as spectral information and the image data after the change is outputted.

Adjustment image data output means 307 outputs the image on the basis of the image data outputted from the adjustment image data calculation means 306. A CRT, an LCD, a printing, an electrophotograph printing, an ink jet print, or the like can be used as an output system.

According to the embodiment as mentioned above, an image under a desired light source can be simulated and the influence by the light source which is exerted on the reproduction image can be easily confirmed.

Further, in such a case, the user can easily select or set the light source on the basis of the monitor image.

[Embodiment 4]

The embodiment 4 relates to an automatic search of an optimum light source to reproduce a predetermined image in a desired color.

For example, the coloring of perishable foodstuffs such as fruits, vegetables, and the like is an importance factor to show the freshness and quality of them. For example, when an apple is displayed at a shop, the "coloring" is nothing but an image appealing to the sense of sight of a customer who observes the apple. The customer compares the image with an individual image evaluation reference what is called a memory color and judges whether the image of the displayed apple satisfies the reference or not, thereby judging the freshness, quality, or the like. In the example, the image to be obtained in the invention denotes the image of the apple including the above-mentioned memory color of the customer or a favorite color formed by individual experience. The actual coloring image of the apple is formed by the spectral information of the illumination light source including an environmental light and the spectral information of the apple. Therefore, by using the image adjusting method of the invention using the spectral information of the illumination light source, it is possible to search the light source to obtain an image such that the color and image of the apple satisfy the reference of the purchaser who judges.

Figure 6:
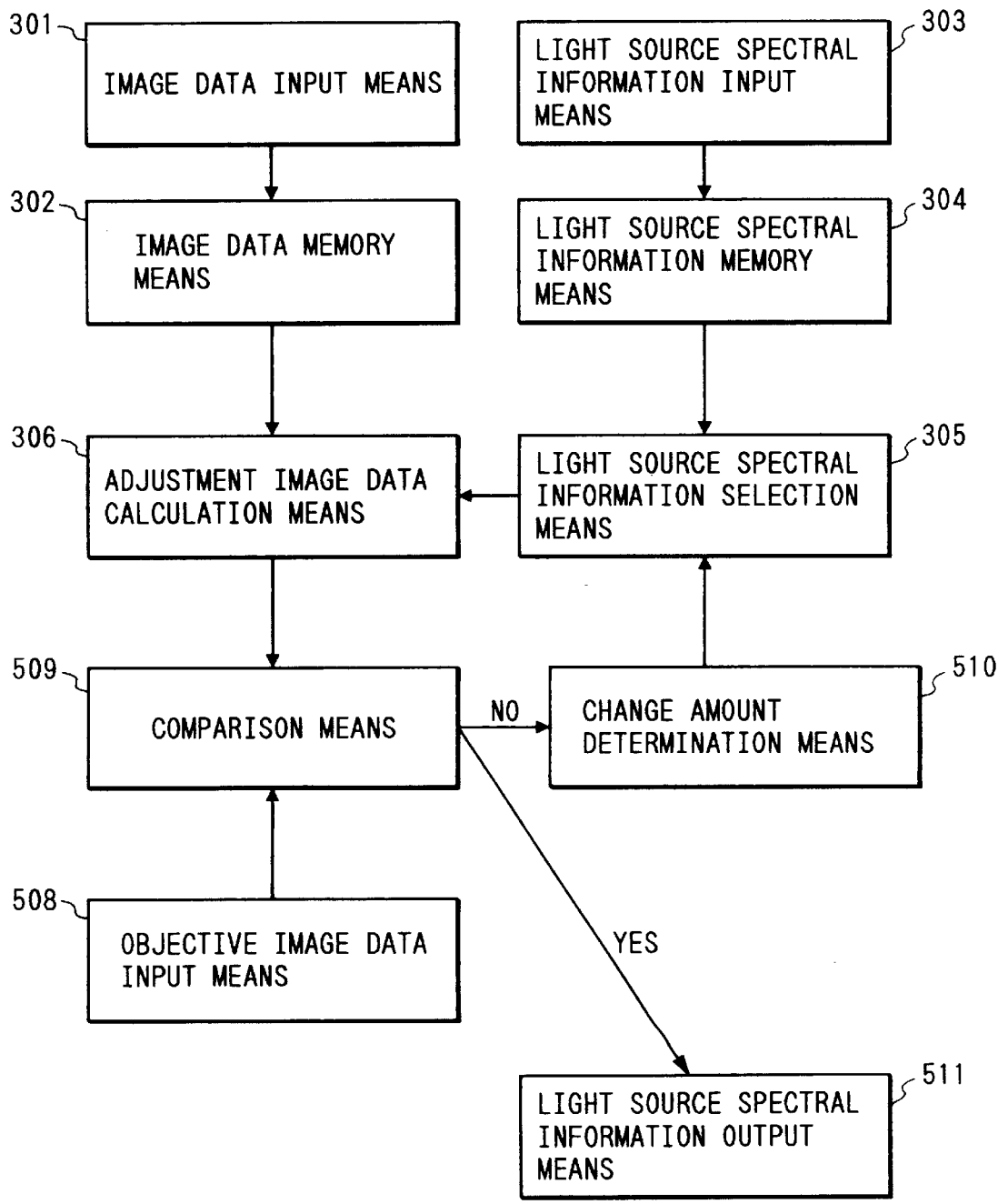
FIG. 6 is a functional block diagram showing a construction of a color processing apparatus of the embodiment 4 to which the invention is applied.

FIG. 6 is a block diagram showing an example of a functional construction according to the embodiment 4.

The means 301 to 306 having the same functions and constructions as those in the embodiment 3 are designated by the same reference numerals and their descriptions are omitted here.

In the embodiment 4, there are newly provided objective image data input means 508, comparison means 509, and change amount determination means 510. A repetitive work loop for the automatic search is constructed by a portion of 509 and 510 and a portion of 305 and 306. A case of the (n−1)th loop to the (n)th loop will be described hereinbelow as an example.

The adjustment image data is calculated by the adjustment image data calculation means 306 on the basis of the input image data obtained by the image data input means 301 and image data memory means 302 and the light source spectral information obtained by the light source spectral information input means 303, light source spectral information memory means 304, and light source spectral information selection means 305.

On the other hand, objective image data indicative of an objective image to be obtained is inputted by the objective image data input means 508.

The comparison means 509 compares the objective image data inputted from the adjustment image data calculation means 306 and the adjustment image data inputted from the objective image data input means 508 and judges whether the difference between them is equal to or less than the allowable value which is properly set or not.

In the case where the difference is equal to or less than the allowable value, light source spectral information output means 511 outputs the light source spectral information which was used to calculate the (n−1)th adjustment image data and/or light source combination information.

When the difference is above the allowable value, the (n)th work loop is executed.

Namely, the comparison means 509 outputs the information regarding the difference obtained by the comparison to the change amount determination means.

The change amount determination means 510 determines and outputs change amounts of the light source spectral information and/or the light source combination information to reduce the difference on the basis of the light source spectral information which was used for the (n−1)th loop and/or the light source combination information by using what is called an optimizing method such as method of least squares, quasi-Newton method, Lagrange multiplier method, or the like.

The light source spectral information indicates the shape of the spectral distribution curve and the numerical value data mentioned in the embodiment 1 and the numerical value data of every wavelength is changed as a change amount. For example, in the case where the wavelength is discreted every 10 nm in a range from 380 nm to 780 nm, a change amount $\Delta(\lambda)$ is equal to 41.

When it is now assumed that the (n−1)th light source spectral information is set to $S^{[n-1]}(\lambda)$ and the (n)th light source spectral information is set to $S^{[n-1]}(\lambda)$, the change amount $\Delta(\lambda)$ is expressed by the equation (1).

$$S^{[n]}(\lambda)=S^{[n-1]}(\lambda)+\Delta(\lambda) \qquad (1)$$

In the light source synthesized by the combination of a plurality of light sources, the change amount of the combination information of the light sources denotes an adjustment parameter to change a mixture ratio or the like of the synthesization. Such an example will now be explained hereinbelow.

When $(\lambda)$ light sources are selected among the registered light sources, $(\lambda)$ mixture ratio parameters $C_i$ and $(\lambda)$ change amount parameters $\Delta_i$ are used.

The (n−1)th composite light source $S^{[n-1]}(\lambda)$ is expressed by the equation (2) by using (k) light source spectral information $S_i(\lambda)$, (i=1 to k) and the mixture ratio parameters $C_i$.

$$S^{[n-1]}(\lambda) = \sum_{i=1}^{k} C_i^{[n-1]} S_i(\lambda) \qquad (2)$$

The change amount parameter $\lambda_i$ operates for the mixture ratio and the (n)th synthetic light source $S^{[n]}(\lambda)$ is expressed by the equation (3).

$$\begin{aligned} S^{[n]}(\lambda) &= \sum_{i=1}^{k} (C_i^{[n-1]} + \Delta_i) S_i(\lambda) \\ &= \sum_{i=1}^{k} C_i^{[n]} S_i(\lambda) \end{aligned} \qquad (3)$$

Although a linear coupling has been used as a synthetic form in the example, a high-order synthetic form of the secondary-order or higher can be also used.

Although the mixture ratio parameter has been changed in the above example, it is also possible to change, for example, the combination of the light sources.

Figure 7:
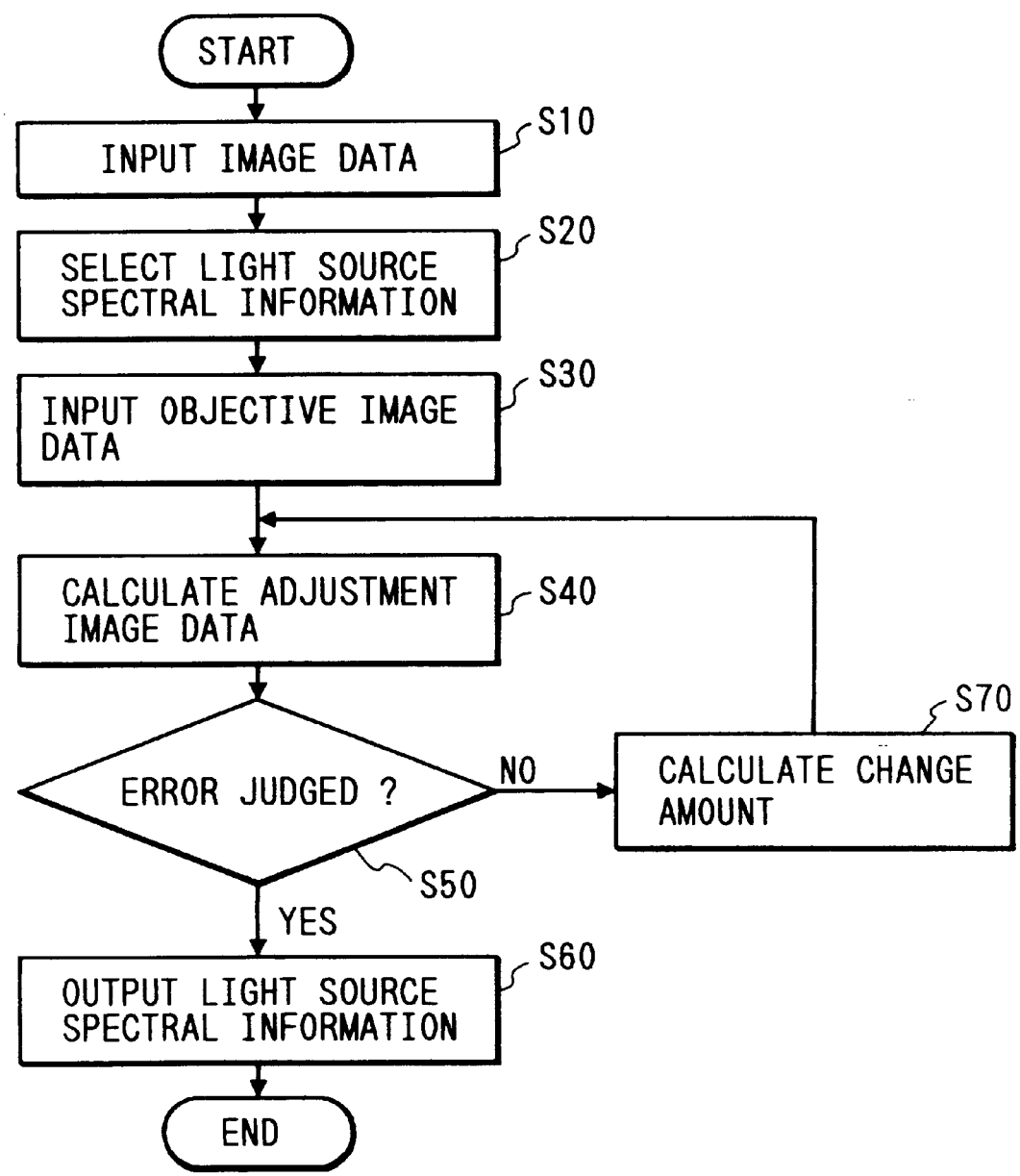
FIG. 7 is a diagram showing a flow of the color process of the embodiment 4 to which the invention is applied.
Figure 8:
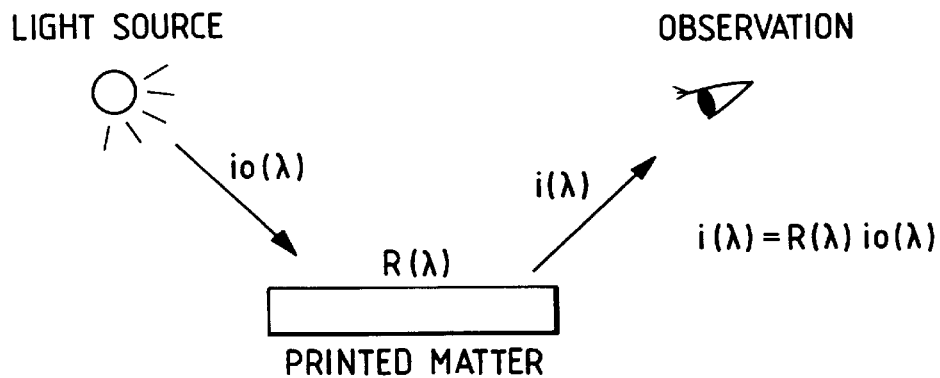
FIG. 8 is a schematic diagram showing spectral characteristics values of a system comprising a light source and a printed matter.
Figure 9:
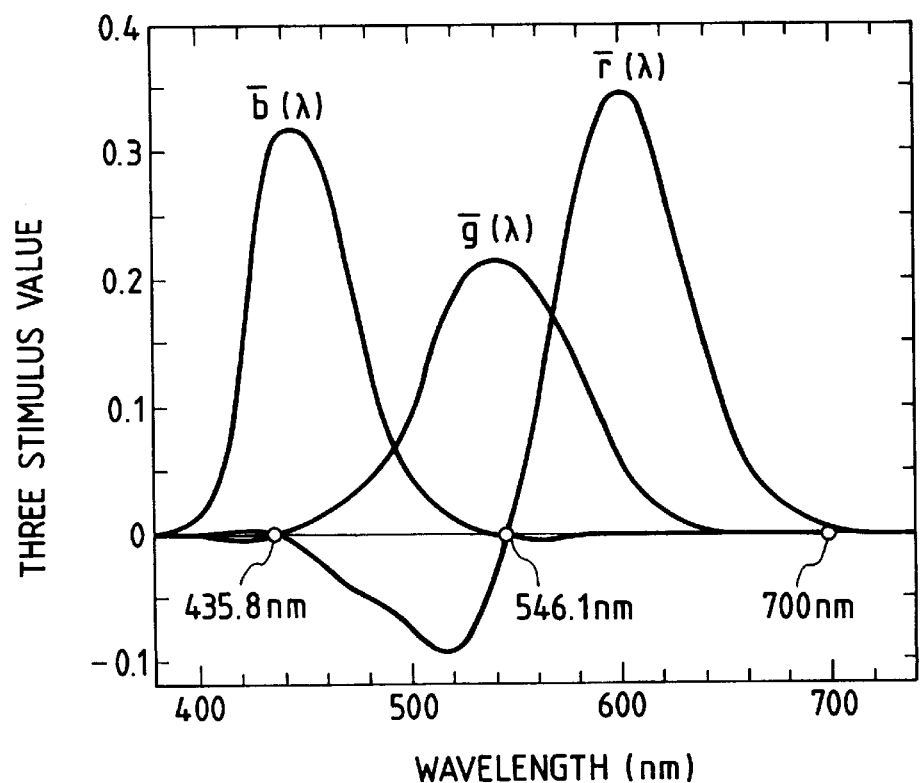
FIG. 9 is a graph showing an rgb color matching function of the CIE (1931)
Figure 10:
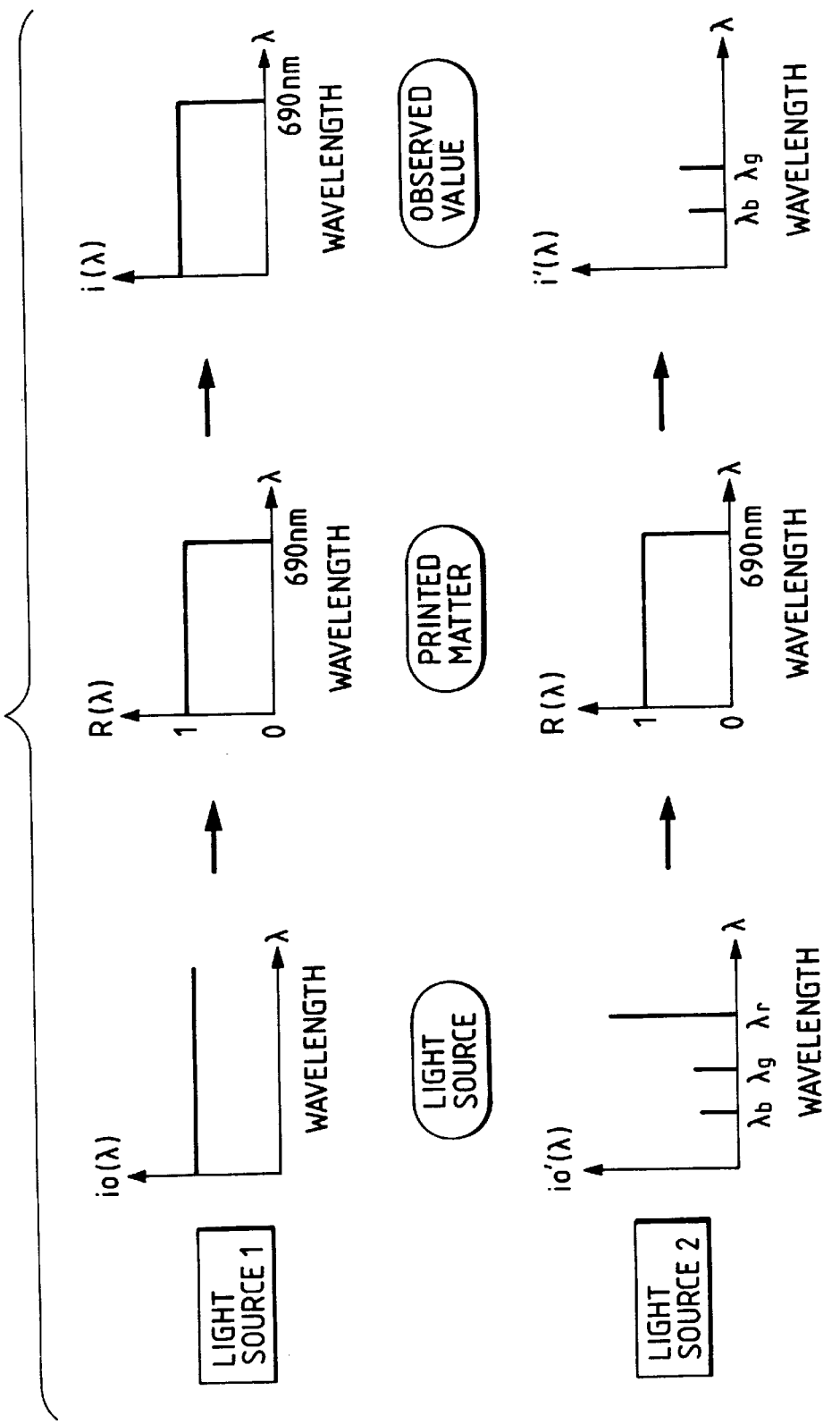
FIG. 10 is a diagram showing spectral characteristics values of a system of a printed matter by two kinds of light sources.
Figure 11:
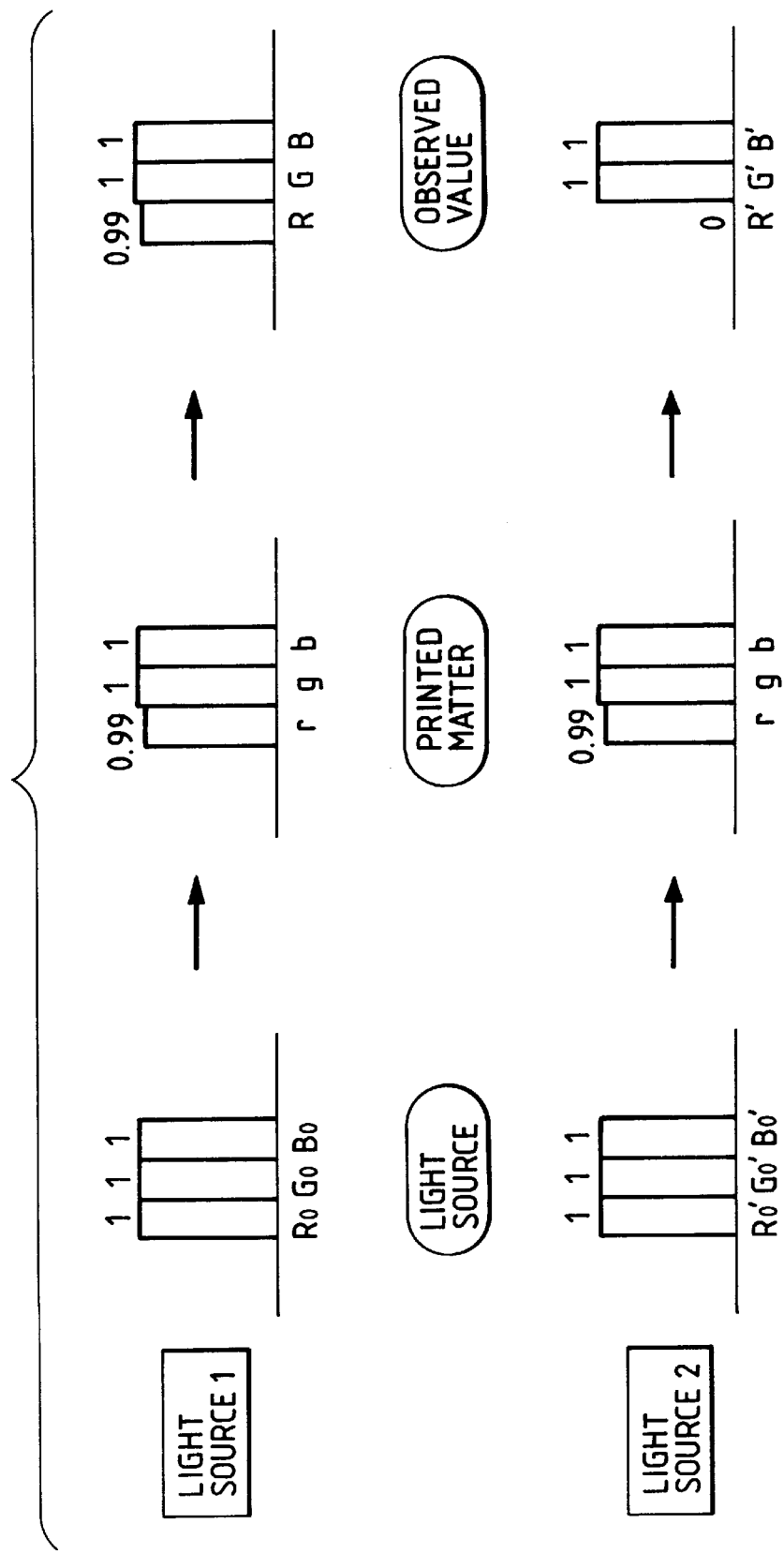
FIG. 11 is a diagram showing RGB values of the system of the printed matter by two kinds of light sources.
Figure 12:
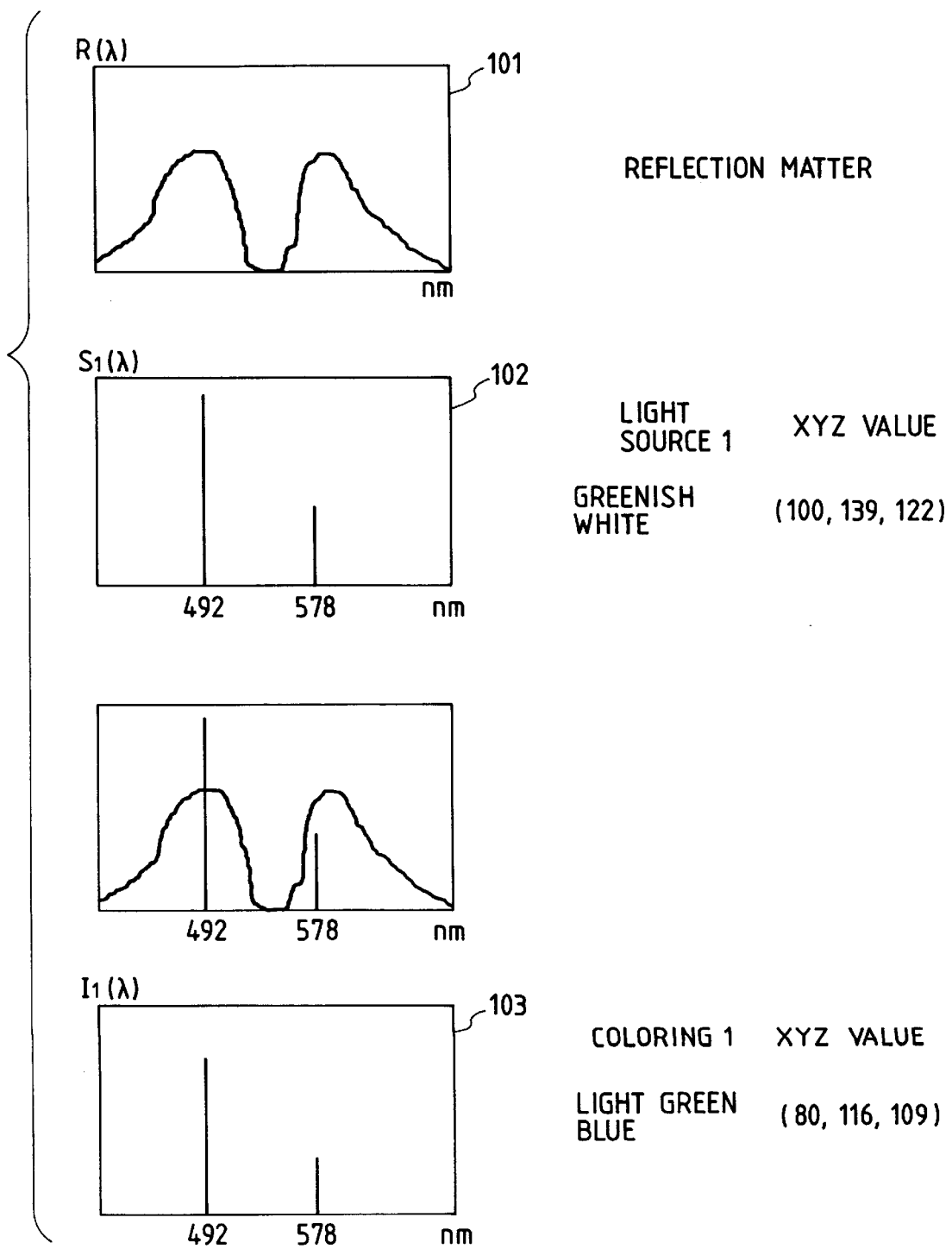
FIG. 12 is a diagram showing a coloring by a light source 1.
Figure 13:
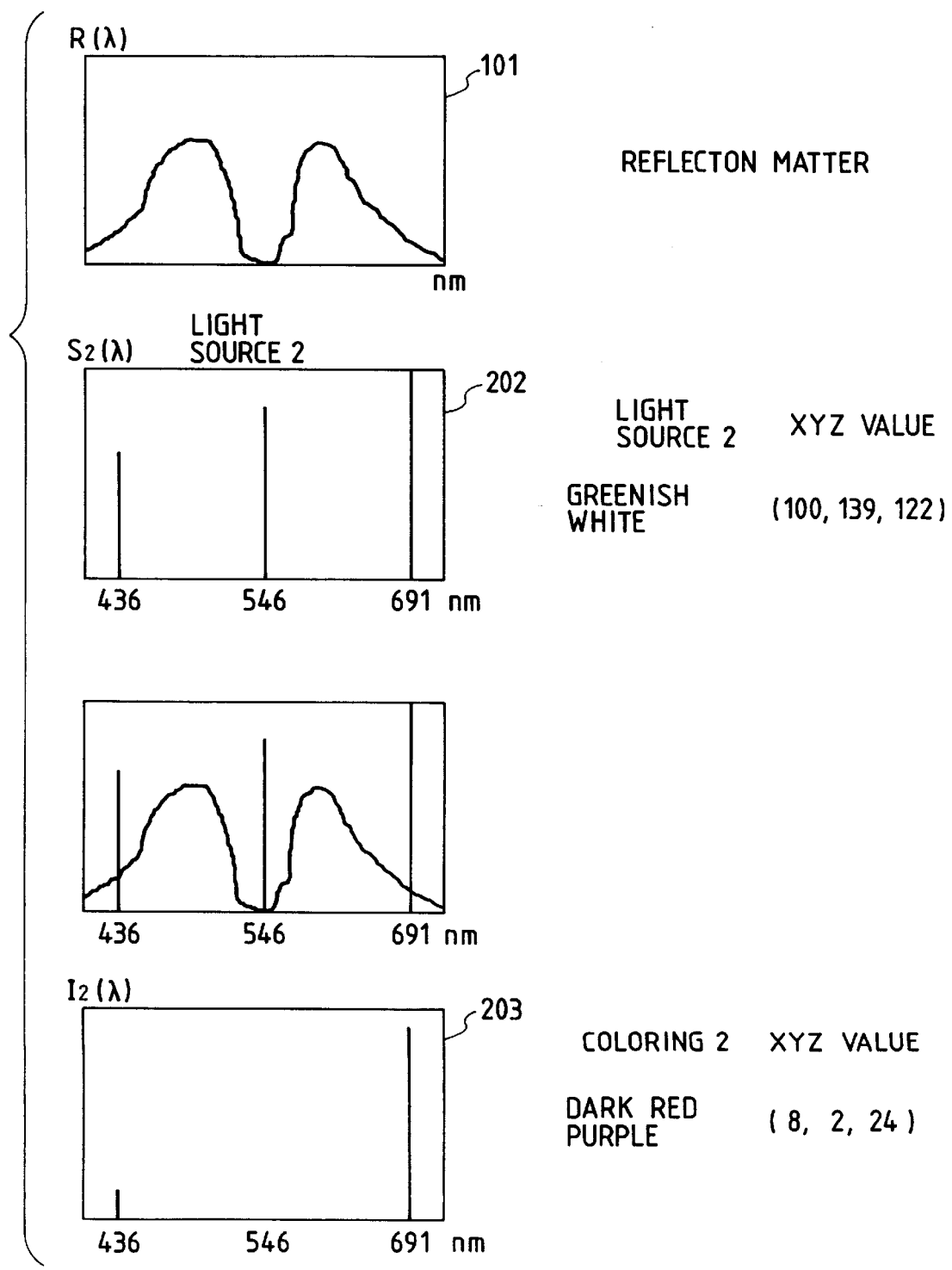
FIG. 13 is a diagram showing a coloring by a light source 2.

A flow of the processes will now be described with reference to FIG. 7.

The image data shown by the spectral information is inputted in step S10. In step S20, every time a light source which is used to observe a reproduction image is selected, light source spectral information regarding the light source is read out. In step S30, objective image data as an object shown by the spectral information is inputted. In step S40, adjustment image data is calculated on the basis of the image data and light source spectral information obtained in steps S10 and S20. In step S50, the adjustment image data obtained in step S40 and the objective image data inputted in step S30 are compared and a check is made to see if the difference between them is equal to or less than a preset allowable value or not. When the discrimination result in step S50 is equal to or less than the allowable value, the light source spectral information which was used to obtain the compared adjustment image is outputted in step S60. On the other hand, when the discrimination result is larger than the allowable value, the change amount to change the light source spectral information is calculated in step S70. On the basis of the light source spectral information based on the calculated change amount, the above processes in steps S40 and S50 are repeated.

It is not always necessary to set an objective image for the whole area of the image. A certain area of the image may be also set. It indicates that only the apple in the above example can be designated as an objective image. The invention is not limited to the example of the apple but can be also applied to various images such as human skin, green of trees, and the like.

The presence or absence of a display unit or the like for the light source spectral information selection means 305 in the embodiment can be properly selected. Namely, it is sufficient for the light source spectral information selection means 305 in the embodiment to decide the (n)th light source spectral information and/or the light source combination information on the basis of the change amounts of the light source spectral information and/or the light source combination information outputted from the change amount determination means 510 and to output them to the adjustment image data calculation means 306.

According to the embodiments as mentioned above, the light source to reproduce the input image in a desired color can be easily obtained.

Although the spectral information has been used as image information indicative of the original in the above-mentioned embodiments, other image data format such as RGB image data, XYZ image data, or the like can be also used. When the RGB image data, XYZ image data, or the like is used, since the image information amount indicative of the original is reduced, the accuracy deteriorates. The arithmetic operation, however, is simplified and the processing speed is raised.

Therefore, in accordance with the object of the user, the above two processes can be also manually switched.

In order to reduce the information regarding the original or light source, the interval of the wavelengths to be sampled can be also largely set.

That is, by changing the interval of the wavelengths to be sampled, the information amount can be freely changed.

As described above, according to the embodiments, degrees of freedom are not limited in the color processes such as color designation, color process, and the like, a desired color process can be executed.

The output image information based on the light source can be also formed.

The light source to allow a predetermined image to be seen in a desired color can be also easily set.

The present invention is not limited to the foregoing embodiments but many modifications and variations are possible within the spirit and scope of the appended claims of the invention.

What is claimed is:

1. An image processing apparatus comprising:

inputting means for inputting spectral information representing an input color, the spectral information corresponding to a function of a wavelength of light from the color;

adjustment information input means for inputting color adjustment information corresponding to a manual instruction of a user;

color processing means for performing color processing on the spectral information on the basis of the color adjustment information to generate color-processed spectral information representing an output color;

outputting means for outputting the color-processed spectral information; and spectral information display means for displaying a spectral distribution of the spectral information.

2. An apparatus according to claim 1, wherein said color adjustment information is input using a scanning screen displayed by a desired color system.

3. An apparatus according to claim 1, further comprising formation means for forming color image data representing the color image based on the color-processed spectral information, wherein said outputting means outputs the color image data to a color image output unit.

4. An apparatus according to claim 1, wherein said color processing means includes at least one of recording material characteristics input means, recording material characteristics display means, recording material characteristics adjustment means, coloring material characteristics input means, coloring material characteristics adjustment means, recording matter structure input means, recording matter color analysis means, and recording matter color information display means.

5. An apparatus according to claim 4, wherein said recording material characteristics adjustment means or said coloring material characteristics adjustment means includes color information adjustment means.

6. An apparatus according to claim 4, wherein said recording material characteristics display means or said coloring material characteristics display means includes color information display means.

7. An image processing method comprising the steps of:

inputting image spectral information for an input color, the spectral information corresponding to a function of a wavelength of light;

inputting light source spectral information corresponding to a light source;

adjusting the light source spectral information;

performing color correction on the image spectral information to generate color-corrected spectral information representing an output color, on the basis of the adjusted light source spectral information; and outputting the color-corrected spectral information.

8. An image processing apparatus comprising:

image information input means for inputting image spectral information for an input color, the spectral information corresponding to a function of a wavelength of light;

light source information input means for inputting light source spectral information corresponding to a light source;

light source adjustment means for adjusting the light source spectral information;

color correction means for performing color correction on the image spectral information to generate color-corrected spectral information representing an output color, on the basis of the adjusted light source spectral information; and output means for outputting the color-corrected spectral information.

9. An image processing method comprising the steps of:

inputting original color spectral information, the spectral information being indicative of light source characteristics;

inputting objective color spectral information; and calculating a light source condition for converting the original color spectral information into the objective color spectral information.

10. An image processing apparatus comprising:

image information input means for inputting image spectral information for an input color image, the spectral information corresponding to a function of a wavelength of light;

light source information input means for inputting light source spectral information corresponding to a light source, the light source information input means including memory means for storing a plurality of light source spectral information which correspond to a plurality of light sources and selection means for selecting desired light source information from among the plurality of light source information stored in said memory means;

color correction means for performing color correction on the image spectral information, on the basis of the light source spectral information; and output means for outputting a color-corrected spectral information representing an output color image.

11. An image processing apparatus comprising:

original color information input means for inputting original color spectral information;

objective color information input means for inputting objective color spectral information; and calculating means for calculating a light source condition for converting the original color spectral information into the objective color spectral information.

12. An apparatus according to claim 11, further comprising color correction means for producing color corrected spectral information by performing color correction of the image spectral information on the basis of light source spectral information corresponding to the light source condition, and wherein said calculating means compares the color corrected spectral information with the objective image spectral information.

13. An image processing method comprising:

an inputting step of inputting spectral information representing an input color, the spectral information corresponding to a function of wavelength of light from the color;

an adjustment information input step of inputting color adjustment information corresponding to a manual instruction of a user;

a color processing step of performing color processing on the spectral information on the basis of the color adjustment information to generate color-processed spectral information representing an output color, the color processing step performing the color processing on the basis of an instruction manually input by a user; and an outputting step of outputting the color-processed spectral information.

14. A method according to claim 13, further comprising a user interface for displaying the color-processed spectral information by using a two-dimensional plane.

15. A method according to claim 14, wherein the user interface displays the color-processed spectral information by using a color system.

16. A method according to claim 15, wherein the color system is XYZ, HCV or L*a*b* color system.

17. A method according to claim 13, wherein said color processing step performs the color processing according to an output condition.

18. A method according to claim 17, wherein the output condition includes coloring material characteristics or recording material characteristics.

* * * * *

UNITED STATES PATENT AND TRADEMARK OFFICE
CERTIFICATE OF CORRECTION

PATENT NO. : 6,061,153

DATED : May 9, 2000

INVENTOR(S) : Mitsuro Sugita

It is certified that error appears in the above-identified patent and that said Letters Patent is hereby corrected as shown below:

COVER PAGE:

In the Abstract, "information comprises" should read
--information are disclosed. The apparatus comprises--.

COLUMN 10:

Line 52, "$S^{(n-)}(\lambda)$," should read --$S^{(n)}(\lambda)$,--;

Line 65, "$(\lambda)$" should read --(k)--; and

Line 66, "$(\lambda)$", both instances, should read --(k)--.

COLUMN 11:

Line 10, "$\lambda_i$," should read --$\Delta_i$,--.

Signed and Sealed this

Tenth Day of April, 2001

Attest:

NICHOLAS P. GODICI

Attesting Officer

Acting Director of the United States Patent and Trademark Office